United States Patent [19]

Fine et al.

[11] Patent Number: 4,493,551

[45] Date of Patent: Jan. 15, 1985

[54] ILLUMINATION MEANS FOR 3-D PRINTING APPARATUS

[76] Inventors: Richard A. Fine, P.O. Box 6945, Marietta, Ga. 30065; George F. Nason, III, 5568 Naylor Ct., Norcross, Ga. 30092

[21] Appl. No.: 478,325

[22] Filed: Mar. 24, 1983

[51] Int. Cl.³ .................. G03B 27/32; G03B 35/14
[52] U.S. Cl. .......................... 355/22; 355/67; 355/77
[58] Field of Search ............. 355/22, 67, 70, 71, 355/77; 354/112–115

[56] References Cited

U.S. PATENT DOCUMENTS

| | | | |
|---|---|---|---|
| 2,353,512 | 7/1944 | Simmon | 355/67 |
| 2,506,131 | 5/1950 | Bonnet | 355/22 |
| 3,322,028 | 5/1967 | Coppage, Jr. | 355/67 X |
| 3,874,792 | 4/1975 | Turner | 355/67 |
| 3,887,279 | 6/1975 | Rubin | 355/70 X |
| 3,897,147 | 7/1975 | Simon | 355/70 X |
| 4,111,548 | 9/1978 | Pechev et al. | 355/37 X |
| 4,120,562 | 10/1978 | Lo et al. | 355/22 X |
| 4,132,468 | 1/1979 | Lo et al. | 355/22 X |
| 4,240,738 | 12/1980 | Praamsma | 355/71 X |
| 4,274,131 | 6/1981 | Praamsma | 355/67 X |

Primary Examiner—Richard A. Wintercorn

[57] ABSTRACT

Illumination apparatus for a three-dimensional enlarging printer in which a moving lamphouse assembly is tilted at angles that vary proportional to the distance of the lamphouse from the center of scan. The tilt angle of the lamphouse is controlled by a motor or the like to direct the maximum illumination available towards the negative and lens associated with the printer and onto the print film to produce a high quality print rapidly.

5 Claims, 3 Drawing Figures

ILLUMINATION MEANS FOR 3-D PRINTING APPARATUS

TECHNICAL FIELD

The present invention relates to printing apparatus for producing three dimentional or stereoscopic pictures and, more particularly, to a technique for improving illumination in the printing apparatus to produce high quality prints more rapidly.

BACKGROUND OF THE INVENTION

In one approach of producing a three-dimensional print, a series of photographs are taken of the subject field from differing angles of view. The negatives in the series are projected onto film covered with a lenticular screen to form very narrow images of the subject. The exposed film is developed and viewed with a lenticular screen such that from any given viewing angle the screen projects through the lenslets a composite image of only one of the negatives. Since the eyes of a person viewing the screen are disposed at two spaced viewing angles relative to the screen, the screen projects two different composite images to the eyes, corresponding to two different viewing angles of the subject field and thus produces a stereoscopic image.

To print the negatives in the series, the area beneath each lenticule is divided into a number of equal segments corresponding to the number of negatives in the series. The first negative in the series is aligned with a projecting lens such that the image, which is laterally condensed by the lenticules into a narrow band, falls upon and exposes the film only in the designated segment area below the lenticules of the lenticular screen. This process is repeated for each negative in the series to fill in the remainder of segments below each lenticule.

For any given viewing angle, the lenticules of the screen project and enlarge only a portion of the film below each lenticule, which may be a segment or less than a segment. The portion projected by each lenticule corresponds to the same photograph in the series such that the projected and enlarged portions form a continuous, composite photograph. When the screen is viewed from a different viewing angle, a different portion of the print below each lenticule, corresponding to a different photograph in the series and thus a different viewing angle, is projected and enlarged to form another continuous, composite photograph. Accordingly, when the screen is viewed simultaneously from two different viewing angles, as occurs when a viewer looks at the screen through both eyes, different composite images, representative of two different angles of view of the subject field, are projected to each eye, and the print appears to be three-dimensional.

In three-dimensional printing processes, when each negative in the series is projected onto a segment of lenticular film, the focal width of the laterally condensed image is such that the projected image on the film does not occupy the entire segment, but takes up only a small part of the designated segment. In order to avoid gaps between segments, apparatus is provided for expanding the individual, projected, condensed very narrow line images to fill in the remaining area of the designated segment, such that the images in the segments will be continuous but do not overlap.

Preferred methods and apparatus for carrying out the printing process are disclosed in U.S. Pat. No. 3,953,869, the pertinent portions of which are hereby incorporated into the present application. As there disclosed, for each negative in the series, the negative is first positioned in front of the light gate so as to be aligned with the projecting lens. The lamp is turned on behind the negative, to project the negative image through the light gate and projecting lens onto the lenticular screen. Each lenslet of the screen condenses the image incident thereon into a narrow band and directs the bank onto a portion of the unexposed film. The projecting lens is positioned such that the band falls within the pre-assigned segment. The film, light source and projecting lens are thereafter moved synchronously, either continuously or intermittently, to scan the film and fill in the remaining area of the segment.

Once the segment is filled, the light source is turned off by closing a shutter and is stopped, and the negative carrier is shifted to move the first negative in the series out of the light gate and position the second negative in the series in front of the light gate. The light source is again turned on, and the light source, negative, and projecting lens are moved synchronously, either continuously or in steps, to scan the second segment below each lenticule. This process is repeated for the remaining negatives in the series until all the segments under each lenticule are filled.

The foregoing apparatus is advantageous in that a projector may be employed. Also the ability of the negative carrier to handle a series of attached negatives permits the machinery to be fully automated, including the feeding and withdrawal of film strip carrier, and the feeding and withdrawal of lenticular print film to and from the exposure station.

In the foregoing arrangement, the light source is moved along with the travelling negative and lens to provide adequate exposure light intensity. The light source is mounted behind the negative and is synchronously driven with the negative and projection lens housing. Typically the light source is a lamphouse in which illumination emanates from the output diffusing surface in a dispersed pattern. Therefore, the last diffusing surface of the lamphouse does not transmit the available light effectively. With this pattern of illumination a greater diffusion is necessary to provide sufficient illumination coverage particularly at the most severe angle of scan when the illumination source is furthest from the center of scan. It is therefore desirable to improve illumination in these types of printing apparatus to produce high quality prints more rapidly.

SUMMARY OF THE INVENTION

The present invention is an improvement in printing apparatus for producing three-dimensional print film from a series of negatives. This is accomplished by an improved lamphouse that is titled at predetermined angles to direct the brightest portion of its illumination pattern toward the print material. This further permits using less diffusion in the lamphouse design thus increasing the brightness available to the print material from a particular lamp. As a result a high quality print can be made more rapidly. More particularly, a printing apparatus in accordance with the present invention includes a tiltable lamphouse moving in a predetermined path in conjunction with a projecting lens for enlarging and projecting a negative onto lenticular print film. A negative carrier is associated with the projector housing for positioning the negatives sequentially in front of a light gate. The illumination available for exposing the negatives in series onto the unexposed film is increased by tilting the lamphouse at variable angles as the lamphouse scans across the print material. The angle varies proportionately with the distance of the lamphouse from the center of scan. With this structure more illumination is available for scanning to produce high quality prints more rapidly.

Another aspect of the invention is that in scanning of each segment of the film, a first motor, for example a stepping motor, is coupled to the projector housing for moving both the housing and film carrier during the scanning operation for each negative. After the first segment is scanned, the stepping motor stops the projector housing and negative carrier and a second stepping motor, connected to the negative carrier, moves the negative carrier relative to the projector housing to move the first negative out of the light gate and to position the next negative in front of the light gate. The first stepping motor thereafter resumes the scanning operation, moving both the projector housing and the negative carrier, to fill in the second segment of the unexposed film below the lenticular screen. This operation is repeated for each negative in the series. A driving motor is coupled to the lamphouse. The motor speed and light cone width are determined, based upon the operating characteristics of the printer, such that the lamphouse can move intermittently or without stopping through the entire printing cycle of all the negatives in the series. A separate motor drive is provided to tilt the lamphouse at the appropriate angle. Alternatively a camming action or multiple link mechanism are provided to effect the desired tilting of the lamphouse to improve illumination.

For a better understanding of the invention, reference is made to the following detailed description of a preferred embodiment, taken in conjunction with the drawings accompanying the application.

DETAILED DESCRIPTION OF A PREFERRED EMBODIMENT

Figure 1:
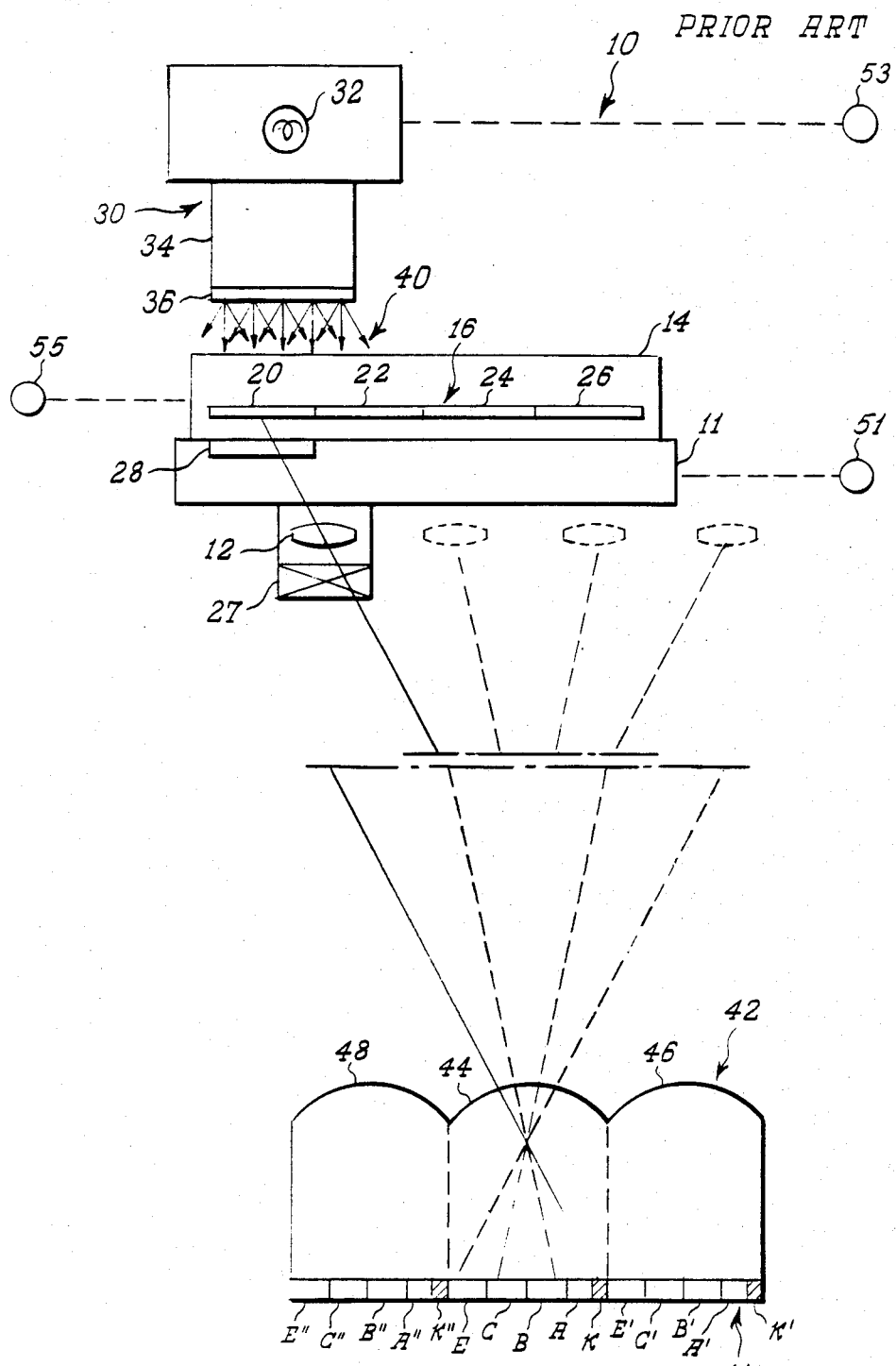
FIG. 1 shows a representative single-lens printing system including lamphouse according to the prior art.

FIG. 1 depicts a 3-D printer system 10 at the start of the printing cycle. A projector housing 11 supports an enlarging lens 12 and a negative film strip carrier 14. The solid line image of the lens 12 represents the starting position of the lens, while the phantom line images represent the position of the lens during later stages of the printing cycle.

A film strip 16, which, by way of example has a series of four two-dimensional frames 20, 22, 24 and 26, is supported by the carrier 14 in any conventional fashion. The frames in the series, which represent views of the subject field taken at different viewing angles, may be taken simultaneously by a multi-lens camera, or may be taken successively from a single lens camera moved to a new viewing angle for each exposure. In the starting position shown in FIG. 1, the first negative frame 20 of the film strip series 16 is positioned by the negative carrier 14 in front of a light gate 28. The film strip 16 may be delivered to the film strip carrier 14, and the first negative frame 20 positioned in front of the light gate, using any conventional transport apparatus.

A lamphouse assembly 30 is positioned behind the negative 20 and light gate 28. The lamphouse assembly 30 includes a light source 32 and diffusing chamber 34 which directs illumination onto a diffusing surface 36 towards negative carrier 14. It will be appreciated that illumination 40 emanates perpendicularly from the diffusing surface in a pattern. As a result the diffusing surface of the lamphouse assembly does not transmit available illumination effectively.

The image of the negative frame 20 is projected through the lens 12 and an opened shutter 27 onto a piece of unexposed film 41. The shutter 27 is normally closed to block the light when the film 41 is not being exposed. The film 41 is covered by a lenticular screen 42, such that the portion of the image striking each lenticule, e.g. lenticule 44, 46, 48, is laterally compressed into a relatively small image band K, K', and K" respectively. The size of the film 41 and lenticular screen 42 is exaggerated for the purpose of illustrating the principles of the invention. In printing the four negatives 20, 22, 24 and 26, as shown in FIG. 1 the film 41 beneath each lenticule 44, 46, 48 is divided into four segments, A, B, C and E, of equal size, for receiving images from the four negatives 20, 22, 24 and 26, respectively, in the film strip series 16. The focal width or band width of the laterally compressed image segment K, K' or K" beneath each lenticule is much narrower than the width of the segment, e.g., A, A', A". In order to fill up each entire segment, e.g., A, beneath the lenticule 30, each negative, e.g., 20, is scanned across the segment.

At the beginning of the composing step the film carrier 14 and projector housing 11 are positioned such that the enlarging lens 12 projects the first frame 20 to record the corresponding images K, K', K" at one extreme of the first of the four segments, A, A', A", respectively. The lamphouse assembly 30 is turned on, and a first stepping motor 51, connected to the projector housing 11 and the film strip carrier 14 synchronously moved toward the right looking at the drawing to fill up the entire segment A. The segment may be scanned continuously or in steps.

During the scanning operation of segment A, the lamphouse assembly 30 is moved to the right by a constant speed motor 53. Accordingly, the light moves a distance through the scanning cycle which is less than the distance of movement of the light gate 28 and negative 20. When the apparatus has reached the position in which the segment A has been completely scanned and the lamp is turned off. At this time, a second stepper motor 55, coupled to the film strip carrier 14, shifts the position of the film strip carrier 14 relative to the now stationary projector housing 10, to move the second negative frame 22 in the film strip series into position, in front of the light gate 28. This procedure is continued until the entire image band below the lenticules, e.g., image band made up of segments A, B, C and E, is filled in.

Figure 2:
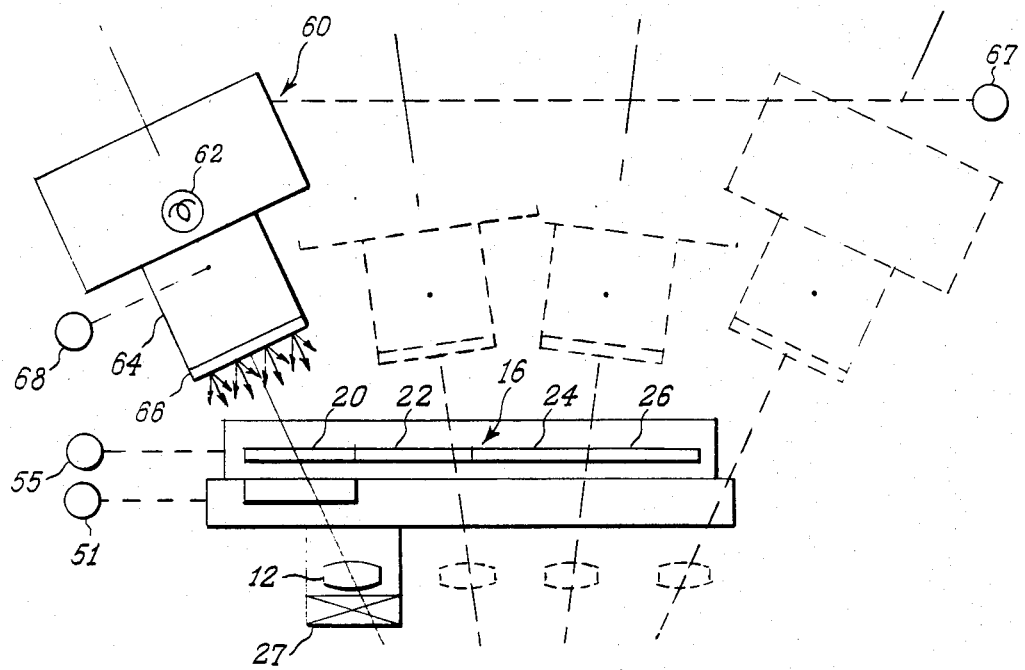
FIG. 2 shows a printing system incorporating lamphouse apparatus according to the present invention.

In accordance with the present invention an improved lamphouse assembly 60 is provided which is tiltable at varying angles during scan. FIG. 2 shows the tiltable lamphouse assembly 60 including light source 62 diffusion chamber 64, and diffusing surface 66 and drive motor 67. The solid line image of the assembly 60 represents the starting position thereof while the phantom line images represent the position of the assembly during later stages of the printing cycle. The assembly tilts at varying angles as the assembly scans across the negative carrier 14 and print film 41. The angle of tilt varies proportionately with the distance of the assembly 60 from the center of scan. The tiltable lamphouse assembly provides more illumination available for scanning. Assembly 60 is tiltable on an axis perpendicular to the path of movement past the print film. The tilting action is accomplished by any suitable means such as a drive motor 68. Drive motor 68 operates to tilt the assembly 60 at the greatest tilt angles at the beginning and end of scan path and at a zero tilt angle at the center of scan path. By this structure greater illmination is available from light source 62 and diffusing chamber 64. The diffusing chamber 64 can now be designed for more directional illumination and thus be more effective. It will be appreciated that the higher illumination level will produce a high quality print at a higher rate.

Figure 3:
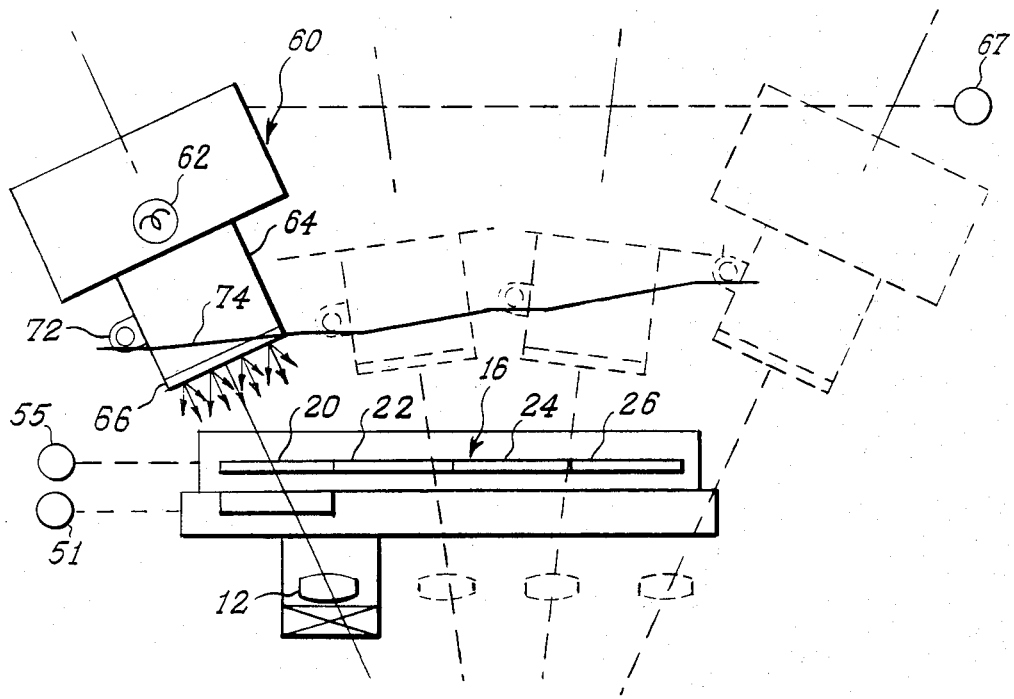
FIG. 3 shows lamphouse apparatus of an alternative embodiment according to the invention.

In liew of the drive motor 68, a camming action can be used to pivot the lamphouse assembly on its axis in proportion to the distance of the lamphouse assembly from the center of the scan. As shown in FIG. 3 a cam member 72 follows camming surface 74 to effect the desired tilt angle. It will be appreciated that a multiple link mechanism could be substituted for the camming mechanism.

The foregoing represents a description of a preferred embodiment of the invention. Variations and modifications of the invention will be apparent to persons skilled in the art without departing from the inventive concept disclosed herein. For example, while the printing apparatus was shown and described as containing a four negative series, the negative series may contain additional or fewer negatives, as desired. All such modifications and variations are intended to be within the scope of the invention as defined in the following claims.

What is claimed is:

1. In apparatus for printing stereoscopic picture of the type including a multiplicity of image bands, each of said image band comprising a plurality N of condensed image segments from a corresponding plurality N of two-dimensional views of an object field taken from spaced vantage points, and a lenticular print film having a corresponding multiplicity of lenticules aligned with the image bands, said apparatus comprising a projecting lens with a light gate in registry therewith, film holder means for positioning sequentially negatives in a negative film strip series containing said N two-dimensional views in said light gate, means for moving said lens at a preselected speed in a direction for projecting respective negatives from a corresponding plurality N of projecting lens locations with the projected image of a selected element of each negative in substantial registry with a reference point, and for stopping said lens at each said lens location for positioning a successive negative in said series in said light gate, and illumination means movable along a predetermined path for exposing at each lens location the respective negative in said light gate for projecting the negative onto a segment of an image band of the print film, the improvement wherein said illumination means comprises a tiltable lamphouse for directing illumination through a negative in said light gate and said lens onto the print film, and control means for tilting said lamphouse at predetermined varying angles that vary proportionately with the distance of said lamphouse from the center of scan of said print film.

2. Apparatus according to claim 1 wherein said control means comprises a motor drive.

3. Apparatus according to claim 1 wherein said control means comprises a camming mechanism.

4. In a method for composing stereoscopic pictures from a negative film strip series containing a plurality N of two-dimensional views of an object field taken from spaced vantage points, comprising the steps of:

positioning a first negative of said film strip series in a light gate having a projecting lens in registry therewith;

moving said lens at a preselected speed in a direction for projecting respective negatives from a corresponding plurality N of projecting lens locations, with the projected image of a selected element of each negative in substantial registry with a reference point;

stopping said lens at each said lens location and positioning a successive negative in said series in said light gate; and moving illumination means with said light gate for projecting the respective negative at each lens location through said lens onto a segment of lenticular print film, the improvement comprising tilting said illumination means at predetermined varying angles during movement thereof to direct greater illumination through said lens onto said print film.

5. A method according to claim 4 including the step of controlling the angle of tilt of said illumination means so that the angle varies proportionately with the distance of the illumination means from the center of scan of said print film.

* * * * *